(12) United States Patent  
Calange

(10) Patent No.: US 9,985,387 B2  
(45) Date of Patent: May 29, 2018

(54) PORTABLE DEVICE COMPRISING AN ELECTRICAL CABLE

(71) Applicant: HAMEUR, Luxembourg (LU)

(72) Inventor: Yves Calange, Montceau les Mines (FR)

(73) Assignee: HAMEUR, Luxembourg (LU)

( * ) Notice: Subject to any disclaimer, the term of this patent is extended or adjusted under 35 U.S.C. 154(b) by 868 days.

(21) Appl. No.: 14/384,521

(22) PCT Filed: Mar. 8, 2013

(86) PCT No.: PCT/EP2013/054772  
§ 371 (c)(1),  
(2) Date: Sep. 11, 2014

(87) PCT Pub. No.: WO2013/135589  
PCT Pub. Date: Sep. 19, 2013

(65) Prior Publication Data  
US 2015/0049573 A1  Feb. 19, 2015

(30) Foreign Application Priority Data

Mar. 12, 2012  (FR) .................................... 12 52182

(51) Int. Cl.  
*H01R 13/64* (2006.01)  
*H01R 13/70* (2006.01)  
(Continued)

(52) U.S. Cl.  
CPC .............. *H01R 13/64* (2013.01); *A47J 43/07* (2013.01); *A47J 43/075* (2013.01);  
(Continued)

(58) Field of Classification Search  
CPC .......... B01F 15/00435; B01F 15/00474; B01F 15/0048; B01F 15/00506; B01F 15/00538;  
(Continued)

(56) References Cited

U.S. PATENT DOCUMENTS 2,616,674 A * 11/1952 Polivka ................. A47J 43/044  
                                                                116/321  
2,678,809 A *  5/1954 Seilberger ............. B01F 7/1695  
                                                                241/282.2  
(Continued)

FOREIGN PATENT DOCUMENTS

DE          1903069 U     10/1964  
DE          4113380 A1    10/1991  
(Continued)

*Primary Examiner* — Joseph Drodge  
(74) *Attorney, Agent, or Firm* — PatShegen IP

(57) ABSTRACT

A portable device has an electric motor connected to a housing with a female electrical socket, an electrical power cable with a male plug and an electrical safety device. The safety device has a first element borne by the male plug and a second element located within the housing. The second element has a locking element to lock an activation element for activating the motor in a deactivated position. The first element of the male plug is configured to engage with the locking element to free the activation element to activate the motor.

10 Claims, 2 Drawing Sheets

(51) Int. Cl.
*A47J 43/07* (2006.01)
*H01H 9/06* (2006.01)
*B01F 15/00* (2006.01)
*H01R 13/703* (2006.01)

(52) U.S. Cl.
CPC .... *B01F 15/0048* (2013.01); *B01F 15/00538* (2013.01); *H01H 9/06* (2013.01); *H01R 13/70* (2013.01); *H01R 13/701* (2013.01); *H01R 13/703* (2013.01)

(58) Field of Classification Search
CPC ...... H01R 13/64; H01R 13/70; H01R 13/701; H01R 13/703; H01R 13/707; H01R 13/71; H01R 13/713; H01H 9/06; A47J 43/07; A47J 43/075
USPC ....... 366/100, 129, 130, 199, 206, 249, 251; 200/50.31; 439/577
See application file for complete search history.

(56) References Cited

U.S. PATENT DOCUMENTS

| | | | | |
|---|---|---|---|---|
| 2,762,613 | A * | 9/1956 | Burton | A47J 43/06 248/315 |
| 2,860,197 | A * | 11/1958 | Kost | H02G 11/02 191/12 R |
| 4,632,319 | A * | 12/1986 | Schlund | B02C 18/12 241/37.5 |
| 7,318,666 | B1 * | 1/2008 | Lin | A47J 43/0766 241/37.5 |
| 7,399,205 | B2 * | 7/2008 | McNeely | A61B 5/0006 340/12.39 |
| 7,749,007 | B1 * | 7/2010 | Gilliam | H01R 13/53 439/188 |
| 2003/0119355 | A1 * | 6/2003 | Knox, Jr. | H01R 9/2641 439/502 |
| 2007/0297281 | A1 * | 12/2007 | Saunders | A47J 43/044 366/251 |
| 2008/0291607 | A1 * | 11/2008 | Braunstein | H01R 25/006 361/601 |
| 2009/0213685 | A1 * | 8/2009 | Mak | A47J 43/0755 366/129 |
| 2009/0284027 | A1 * | 11/2009 | Ogrizek | A47J 43/0705 292/256 |
| 2012/0194163 | A1 * | 8/2012 | Pagenkopf | B60R 16/02 323/311 |

FOREIGN PATENT DOCUMENTS

| | | |
|---|---|---|
| DE | 4235271 C1 | 9/1993 |
| DE | 20201898 U1 | 4/2002 |
| EP | 0263079 A2 | 4/1988 |
| EP | 0617482 A2 | 9/1994 |
| FR | 2890552 A1 | 3/2007 |

\* cited by examiner

PORTABLE DEVICE COMPRISING AN ELECTRICAL CABLE

RELATED APPLICATIONS

This application is a § 371 application from PCT/EP2013/054772 filed Mar. 8, 2013, which claims priority from French Patent Application No. 12 52182 filed Mar. 12, 2012, each of which is herein incorporated by reference in its entirety.

TECHNICAL FIELD OF THE INVENTION

The present invention relates to a portable device equipped with an electrical cable.

More specifically, the present invention relates to a hand blender type of electrical device.

BACKGROUND OF THE INVENTION

This type of device is known from the prior art. It typically comprises an electric motor, protected by a housing connected to an electrical power cable. The electrical device must be able to work in humid environments.

This type of device exists in household electrical appliance ranges. Such devices are also used in the conventional way by catering professionals.

Traditionally, the electric power cable is fixed in a permanent way to the device's housing.

However, such a device poses a problem when the electric power cable is damaged. In effect, damage to the electric power cable raises risks of electric shocks for a user operating the device, obliging the latter to change said cable for his own safety. However, when the electric power cable is fixed permanently to the device's housing, operations to repair or replace said cable systematically involve the device being disassembled by a professional, entailing significant costs and time-consuming work. In addition, as it is systematically necessary to disassemble the housing, the repair operations can take time, leaving the user in a sometimes difficult position. This last point is a particular problem for catering professionals.

In response to these disadvantages, removable electric power cable systems have been introduced.

However, with such systems the electric power cable does not have to be correctly engaged in the device for said device to be switched on. Thus, when the cable is not correctly engaged and despite everything the device is switched on, overheating problems arise at the location of the connection between said cable and the device, which, in the worst cases, can lead to a fire.

OBJECT AND SUMMARY OF THE INVENTION

There is therefore a need to prevent the device being switched on when the electric power cable is not correctly positioned in the device's housing.

One aspect of the present invention makes it possible to resolve this first technical problem.

More specifically, a subject of the present invention is a portable device comprising an electric motor connected to a housing comprising a female electrical socket, an electrical power cable with a male plug able to engage with said female socket, said male plug and said female socket being assembled and separated according to a first axis, the device also comprising an electrical security device. Said electrical safety device comprises a first element, borne by the male plug, and a second element located within the housing. Said second element has a means of locking a means of activating the motor of the device in a deactivated position. The first element of the male plug is able to engage with said locking means, to free the means of activation in order to be able to activate the motor.

Such a device has the advantage of reducing the risks of overheating at the location of the male plug and female socket assembly, which can occur when the plug and socket are assembled incorrectly. Thus, the electrical safety device gives the device an improved level of safety for the user.

According to an embodiment of the invention, the device is configured not to operate when a standard male plug is introduced into the female socket of the housing, thus ensuring safer use of the device.

Preferably, the electrical safety device is a mechanical system. More preferably, the second element of the safety device is mobile within the housing, said second element having a means of elastic recoil towards a locking position and a first stop which, in the locking position, locks the means of activating the motor of the device in a deactivated position. The first element of the male plug is able to move said second element out of the locking position, to free the means of activation in order to be able to activate the motor.

Preferably, the second element is mounted slidably in the housing according to a second axis parallel to the first axis, the first element of the male plug being able to make said second element slide out of the locking position, so as to free the means of activation.

Preferably, the means of activation comprises a second stop locking an "on" button in a device off position.

Such a device has the advantage of having a dual safety system before the device is switched on, a first safety level being the safety device locking the activation means, a second safety level being the activation means locking the "on" button. Switching on the device therefore requires the male plug to be correctly engaged in the female socket, so as to free the activation means, then requires the user to operate the activation means, to unlock the "on" button, and finally requires the user to press the device's "on" button.

Some removable electric power cable systems also comprise a special means for locking the electric power cable and housing of the device. Such systems are described in particular in documents DE4235271, DE4113380 and EP0617482.

However, such systems require the locking means to be manually engaged. Thus, it is not necessary for the locking means to be engaged for operating the device. This is a particular problem insofar as the device operates in humid environments. Indeed, if the locking means is not engaged, or is simply broken, the electric power cable can accidentally become disconnected while in use and, in the worst cases, result in the user being electrocuted.

There is therefore a need to automate the engaging of the locking means, so as to prevent the user from operating the device without the electric power cable and housing assembly being locked.

One preferred embodiment of the invention makes it possible to resolve this second technical problem.

More specifically, according to an embodiment of the invention; the device also comprises a device for locking the male plug in the female socket, said device comprising a third element located in the housing, able to engage with the first element, the third element being mobile with respect to the housing so as to free the first element.

Such a locking device has the advantage of not requiring any specific action by the user during the male plug and female socket assembly phase. Locking the male plug and female socket together is therefore automatic and the safety of the device is increased.

Preferably, the locking device is able to lock the male plug in the female socket in an intermediate position, according to which the locking means holds the means of activating the motor of the device in a deactivated position.

Such a locking device employs an intermediate position for locking the male plug and female socket, which corresponds to the case in which the male plug is not sufficiently engaged in the female socket. In this position, the user cannot switch on the device, due to the safety device locking the activation means, and at the same time the locking device prevents the male plug and female socket from separating inadvertently. This intermediate locking position therefore gives the user an additional level of safety.

Preferably, the third element bears a third stop able to engage with a fourth stop of the first element, the third element being mobile in translation with respect to the housing according to a third axis, so as to free the fourth stop.

Preferably, the housing comprises an opening substantially aligned with the third element according to the axis of translation of said third element.

Such a device has the advantage of requiring an intentional action by the user with the help of an unlocking tool introduced into the opening for deactivating the locking device and therefore separating the male plug and female socket, thus increasing the device's level of safety for the user.

Preferably, the third element is a latch, mobile in translation with respect to the housing according to a third axis substantially perpendicular to the first axis, between a rest position and a locking position, the latch comprising an orifice having a substantially triangular profile with a first narrow extremity and a second extremity that is wide along the third axis.

More preferably, the first element is a pin borne by the male plug and positioned substantially parallel to the first axis, the pin comprises a conical or tapered portion positioned parallel to said first axis, said conical or tapered portion comprising a flared distal extremity forming the fourth stop and a narrow proximal extremity. The device is configured so that, when the latch is in the rest position, the narrow extremity of the orifice of the latch is located opposite the pin.

More preferably, the pin comprises two aligned truncated cones, one truncated cone being proximal, the other truncated cone being distal, a flared portion of said distal truncated cone forming the fourth stop, a flared portion of said proximal truncated cone forming a fifth stop.

Traditionally, the device is handled at arm's length.

However, this type of handling becomes complicated when the device is heavy and large, which is above all the case when it is used by catering professionals.

In addition, to make it easier to store the device, the user often winds the electric power cable around the housing of the device.

However, winding the electric power cable around the housing is often done in such a way that the electric power cable is subjected to significant folding at the location of its extremity connected to the housing of the device. This type of winding the electric power cable results in damage to the cable.

One aspect of the present invention makes it possible to resolve these two technical problems.

More specifically, another subject of the invention is a hand blender type of device comprising an electric motor connected to a housing bearing a female socket. Said motor is able to drive in rotation a shaft, comprising an extremity, located outside the housing, able to receive a tool. Said shaft is arranged along a fourth axis. The device also comprises an electric power cable having a male plug able to engage with the female socket. The housing comprises a surface positioned substantially perpendicular to the fourth axis and oriented towards the extremity of the shaft able to receive a tool. Said surface bears a first raised portion extending towards said extremity and located near to an edge of said surface. The male plug comprises a second raised portion, said first and second raised portions each forming a stop, said stops being able to hold the electric power cable in position wound around the housing.

Such a device has a double advantage. Firstly, the first raised portion makes it possible to hang the device on the edge of a vessel. This system is especially advantageous when the device is heavy and/or large. The user can hang the device on the edge of a vessel and use the device without having to carry it at arm's length. The user also benefits from a sculling effect, i.e. the shaft of the device can be pivoted around the first raised portion, limiting the amount of force to be supplied when handling the device during its use. Secondly, such a device makes it possible to have a cable winding system limiting the folding of said electric power cable at its extremity connected to the housing, and thus minimizing damage to it.

The invention relative to the first and second raised portions can be advantageously combined with the invention of the electric plug's safety system.

BRIEF DESCRIPTION OF THE DRAWINGS

The invention will be better understood after reading the following description and examination of the associated figures. These are provided for information purposes and are in no way limitative with respect to the invention. The figures show.

DETAILED DESCRIPTION OF THE EMBODIMENTS

Figure 1:
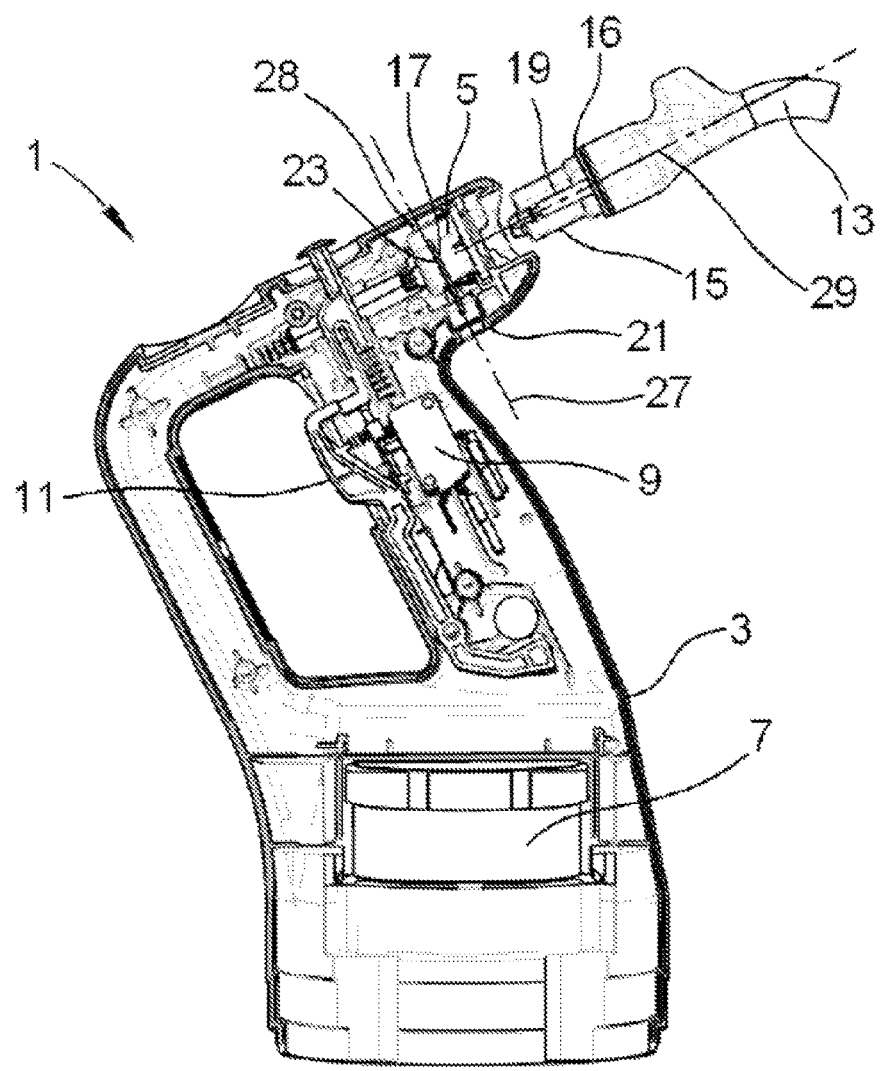
FIG. 1: a cross-section view of a device according to an embodiment the invention.

FIG. 1 shows a device 1 according to an embodiment of the invention. Such a device comprises in particular a housing 3 having a female electric socket 5, and a motor 7 connected to said housing 3 and supplied with electricity via the female socket 5. The motor 7 is connected to a switch 9, itself controlled by an "on" button 11. The motor 7 makes it possible to drive in rotation a shaft 8 (shown in FIG. 4) oriented along an axis 10 and comprising an extremity located outside the housing 3, said extremity being able to receive a tool.

Preferably, the device is a hand mixer and the tool is a blade. According to another embodiment of the invention, the device is a drill and the tool is a drill bit or bit.

The device 1 comprises an electric power cable 13 having a male plug 15 able to engage with the female socket 5. According to a preferred embodiment of the invention, the male plug 15 has a flexible plastic seal 16. Said seal 16 is arranged around the male plug 15 so that, when the male plug 15 and the female socket 5 are assembled, said female socket 5 compresses said joint 16 against the male plug 15. The seal 16 thus ensures the watertightness of the male plug 15 and female socket 5 assembly. As the device 1 works mainly in a humid environment, the seal 16 allows the level of safety of said device 1 to be increased for a user.

The device 1 also comprises a device for locking the male plug 15 in the female socket 5. The process of assembling and separating the male plug 15 and female socket 5 is carried out along an axis 29.

The locking device comprises a first element 17 located in the housing 3 and mobile with respect to the housing 3. Said first element 17 is able to engage with a second element 19 borne by the male plug 15 so that, when the first element 17 moves in the housing 3, said first element 17 frees the second element 19.

According to the embodiment of the invention presented in all the figures, the first element 17 is a latch and the second element 19 is a pin. Preferably, the locking device comprises two pins 19 mounted on either side of the male plug 15.

The latch 17 is mobile in translation with respect to the housing 3 according to an axis 27 substantially perpendicular to the axis 29, between a rest position and a locking position. For example, the latch 17 slides in rails 28 formed in the housing 3. The latch 17 has a relatively flat shape and extends substantially in a plane perpendicular to the axis 29. A first surface of the latch 17, opposite to the male plug 15, forms a stop 23.

Figure 2:
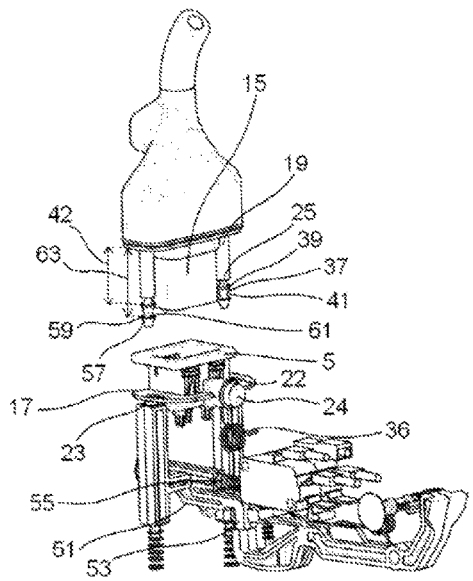
FIG. 2: a perspective view of the safety device and device for locking a device according to the embodiment of FIG. 1.
Figure 3:
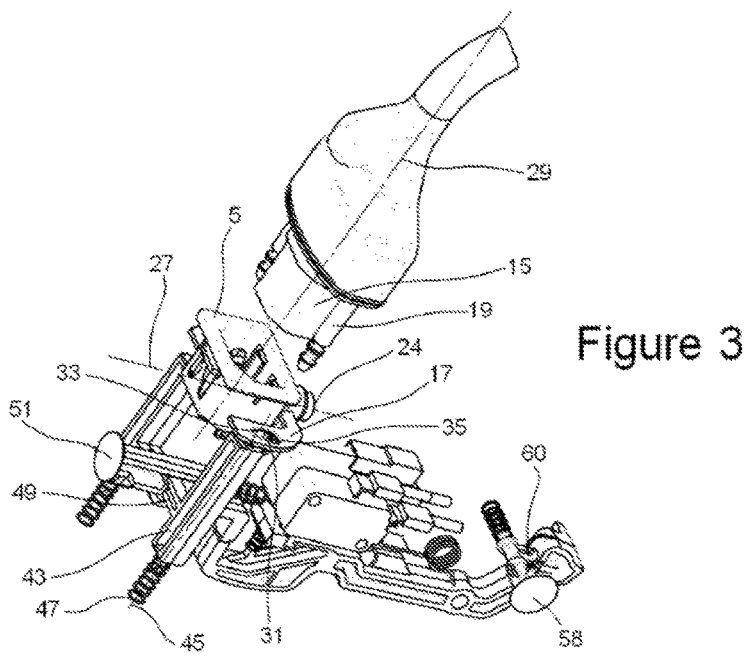
FIG. 3: another perspective view of the safety device and device for locking a device according to the embodiment of FIG. 1.

FIGS. 2 and 3 show perspective views in two different angles of the locking device according to the embodiment of FIG. 1.

The latch 17 also comprises a pusher 24, located facing an opening 21 of the housing (shown in FIG. 1). The pusher 24 comprises a tight seal 22, substantially torus-shaped. The opening 21 is substantially aligned with the latch 17 along the axis 27. Preferably, the opening 21 is too narrow to introduce a finger, which prevents the pusher 24 being pressed inadvertently. The pusher 24 can be covered with a flexible watertight membrane that closes the opening 21.

The locking device can also comprise an unlocking tool, for example with a point. Introducing this point into the opening 21 makes it possible to press on the pusher 24 of the latch 17 to move it along the axis 27 towards the unlocking position.

The latch 17 is connected to the housing 3 (see FIG. 1) by an elastic recoil means 36 fixed to said latch. The elastic recoil means 36 allows the latch 17 to slide in the rails 28 (see FIG. 1) towards the rest position, once the latch 17 is freed from all external stress. The elastic recoil means 36 is, for example, a torsion spring.

According to the embodiment described in all the figures, the latch 17 substantially has a U-shape, with two branches extending either side of the pusher 24, substantially parallel to the axis 27. Each of the two side branches of the latch 17 comprises an orifice 31 with a substantially triangular profile with a first narrow extremity 33 and a second extremity 35 wide along the axis 27. The two orifices 31 are preferably symmetrical relative to each other along the plane formed by the axes 27 and 29.

The pin 19 is positioned substantially parallel to the axis 29. The pin 19 comprises a tapered portion 37 positioned parallel to the axis 29. The portion 37 can also be conical. The tapered portion 37 comprises a flared distal extremity 39 forming the stop 25 and a narrow proximal extremity 41. The narrow extremity 33 of the orifice 31 is located opposite the pin 19 during the first contact of the pin 19 with the latch 17 during the male plug 15 and female socket 5 assembly, the latch 17 then being in the rest position.

During the male plug 15 and female socket 5 assembly phase, the narrow extremity 41 of the tapered portion 37 of the pin 19 comes into contact with the latch 17 at the location of the narrow extremity 33 of the orifice 31. The pin 19 then exerts pressure on the edge of the narrow extremity 33 of the orifice 31 such that the latch 17 is translated along the axis 27 from its rest position to its unlocking position. Thus, the wide extremity 35 of the orifice 31 comes closer to the pin 19. Preferably, the edge of the orifice 31 is chamfered to help the penetration of the pin 19 in the orifice 31. The tapered portion 37 of the pin 19 thus sinks into the orifice 31, until the stop 25 of the pin 19 has extended beyond the orifice 31. The latch 17 thus returns to its rest position with the help of the spring 36, the stop 25 of the pin 17 being received in the narrow extremity 33 of the orifice 31. The stop 25 is then in contact with the first surface of the latch 17 forming the stop 23. Thus, the male plug 15 and the female socket 5 are locked in the assembled position.

According to a preferred embodiment of the invention, only the second surface of the latch 17 is chamfered. In this embodiment, the pusher 24 is asymmetrical according to a plane formed by the axes 27 and 29 and symmetrical according to a plane perpendicular to the axis 29, so that the latch 17, itself oriented with respect to the pusher 24, cannot be mounted in reverse. Mounting in reverse would correspond to mounting the latch 17 such that the chamfer is on the first surface of the latch 17, surface forming the stop 23. According to another embodiment, the two surfaces of the latch 17 are chamfered. In this case, the latch 17 can be symmetrical.

To separate the male plug 15 and the female socket 5, the unlocking tool is introduced into the opening 21 (see FIG. 1) and pushes the pusher 24, so as to cause the translation of the latch 17 along the axis 27 towards the unlocking position. The wide extremity 35 of the orifice 31 thus comes closer to the pin 19. The stop 25 of the pin 19 is then disengaged from the stop 23 of the latch 17, allowing the male plug 15 and the female socket 5 to be separated manually.

The device 1 also comprises a safety device, able to block switching on the device 1, if the male plug (15) and female socket (5) are not correctly arranged. Said safety device comprises a first element 19 borne by the male plug 15, and a second element 43 located within the housing 3. The second element 43 has a means 49 of blocking an activation means 51 in a deactivated position. The first element 19 of the male plug 15 is able to engage with the locking means 49, so as to free the activation means 51 in order to be able to activate the motor 13.

According to an embodiment of the invention, the safety device is a mechanical device. According to another embodiment of the invention, the safety device is a magnetic device, in which a permanent magnet engages with a ferromagnetic part, the magnet being borne by the housing 3 and the ferromagnetic part by the male plug 15. According to another embodiment of the invention, the safety device is an electrical, electronic, or electromechanical device.

According to the embodiment of the invention presented in all the figures, the first element 19 is a pin, and the second element 43 is slidable in the housing 3 along an axis 45 parallel to the axis 29.

The slidable element 43 having a means 47 of elastic recoil towards a locking position, and a stop 49 which, in the locking position, locks a means 51 of activating the motor 7. The elastic recoil means 47 is, for example, a compression spring. The pin 19 is able to make the slidable element 43 slide out of the locking position, so as to move the stop 49 and to unlock the activation means 51. Preferably, a slidable element 43 is associated to each pin 19 borne by the male plug 15. In the embodiment presented in all the figures, a system with two pins associated with two slidable elements has been chosen, to balance the mechanical stresses. However, a system comprising a pin associated to a slidable element can also be envisaged.

According to the embodiment of the invention described in all the figures, the pin 19 and the slidable element 43 are aligned along the axis 45 so that, during the male plug 15 and female socket 5 assembly phase, the pin 19, passing through the orifice 31 of the latch 17, pushes the slidable element 43 along the axis 45 until the stop 49 frees the activation means 51. The spring 47 is thus compressed. When the male plug 15 and female socket 5 are separated, once the force of the pin 19 on the slidable element 43 is removed, the spring 47 returns to its unloaded position and the slidable element 43 to its locking position.

According to an embodiment of the invention, the activation means 51 is mobile in translation along an axis perpendicular to the axis 45. The activation means 51 also comprises a push-button, an elastic recoil means 55 and a stop 53 which, when the activation means 51 is locked by the stop 49, locks the "on" button 11 of the device 1 in the locked position. The elastic recoil means 55 is, for example, a compression spring.

During the male plug 15 and female socket 5 assembly phase, the pin 19 drives the slidable element 43 in translation along the axis 45, which frees the activation means 51 from the stop 49. The activation means 51 can then be pushed along an axis perpendicular to the axis 45, unlocking the "on" button 11 from the stop 53. The "on" button 11 can then be operated to switch on the device by activating the switch 9. Once the pressure exerted on the activation means 51 is removed, the activation means 51 returns to its initial position by means of the spring 55, again locking the "on" button 11 with the stop 49. The "on" button 11 must therefore by operated when pressure is exerted on the activation means 51 for the device to be in an operable state.

In order to make the device 1 easier to use, it is possible to implement a system providing a continuous operation of the device 1 without the user having to press continuously on the activation means 51 and the "on" button 11. According to the embodiment presented in all the figures, continuous operation of the device 1 is maintained by a push-button 58 comprising, amongst others, a raised portion 60 having the effect of locking the "on" button 11 of the device 1 in the "on" position. This type of mechanism is known from the state of the art.

The locking device is also able to lock the male plug 15 in the female socket 5 in an intermediate position, according to which the locking means 49 holds the means 51 of activating the motor 13 of the device 1 in a deactivated position.

According to the embodiment of the invention presented in all the figures, the pin 19 comprises two aligned truncated cones, one truncated cone 57 being proximal, the other truncated cone 37 being distal. The pin 19 can also comprise two aligned cones. A flared portion 39 of the distal truncated cone 37 forms the stop 25, hereinafter the first stop, and a flared portion 59 of the proximal truncated cone 57 forms a second stop 61.

A length 42 of the pin 19 is chosen such that, in the case where the stop 23 of the latch 17 is in contact with the stop 25 of the pin 19, the male plug 15 and the female socket 5 are in the operating position for the device 1.

A length 63 of the pin 19, as well as the dimensions of the elements 43 and 49, are chosen such that, in the case where the latch 17 is in contact with the second stop 61, the stop 49 of the slidable element 43 locks the activation means 51.

During the male plug 15 and female socket 5 assembly phase, the narrow extremity of the tapered portion 57 of the pin 19 comes into contact with the latch 17 at the location of the narrow extremity 33 of the orifice 31. The pin 19 then exerts pressure on the edge of the narrow extremity 33 of the orifice 31 such that the latch 17 is translated to its unlocking position. Thus, the wide extremity 35 of the orifice 31 comes closer to the pin 19. The tapered portion 57 of the pin 19 thus sinks into the orifice 31, until the stop 61 of the pin 19 has extended beyond the orifice 31. If the pressure exerted by the pin 19 on the edge of the orifice 31 is not sufficient, only the stop 61 extends beyond the orifice 31. The latch 17 thus returns to its rest position with the help of the spring 36, the stop 61 being received in the narrow extremity 33 of the orifice 31. The stop 61 is then in contact with the surface of the latch 17 forming the stop 23. In this position, called the intermediate position, the translation of the slidable element 43, driven by the pin 19, is not sufficient for the activation means 51 to be freed from the stop 49 of the slidable element 43. The "on" button 11 of the device 1 thus remains locked. In this configuration, the male plug 15 and the female socket 5 are locked in said intermediate position.

In the case where the pin 19 is locked in the intermediate position, it is necessary to apply new pressure on the male plug 15 along the axis 29 to allow the device 1 to be operated. The narrow extremity 41 of the tapered portion 37 of the pin 19 drives the translation of the latch 17, as described above, leading to the wide extremity 35 of the orifice 31 and the pin 19 coming closer. The tapered portion 37 of the pin 19 thus sinks into the orifice 31, until the stop 25 of the pin 19 has extended beyond the orifice 31. The latch 17 thus returns to its rest position with the help of the spring 36, locking the pin 19 by the stop system described above.

The mechanical system, described above, provides the user with a dual safety system. It makes it possible, firstly, to ensure that the male plug 15 is properly engaged in the female socket 5, since the device 1 can only be placed in an operable state once the male plug 15 and female socket 5 are correctly arranged. Secondly, it makes it possible to prevent inadvertently pulling out the male plug 15 via the electric power cable 13, the separation of the male plug 15 and female socket 5 being possible only by introducing an unlocking tool. As a result, the risks of electrical heating, due to poor assembly of the male plug 15 and female socket 5, which may lead to a fire, are reduced, even eliminated. Insofar as the device 1 can be used in a humid environment, the risks of electrocution are also significantly reduced, even eliminated.

Figure 4:
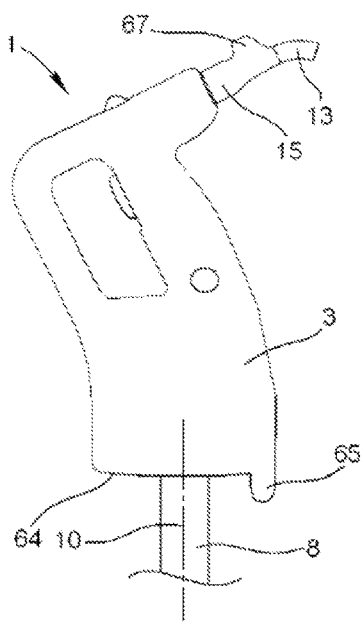
FIG. 4: side view of a device according to the embodiment of FIG. 1.

FIG. 4 shows a side view of the device 1.

The housing 3 has a surface 64, called the lower surface, arranged substantially perpendicular to the axis 10 of the shaft 8 and oriented towards the extremity of the shaft 8 able to receive the tool. The surface 64 bears a first raised portion 65 extending substantially parallel to the axis 10 towards the extremity of the shaft 8 able to receive the tool. The first raised portion 65 is located close to an edge of the surface 64. Preferably, the first raised portion 65 is located on an edge of the surface 64 and extends in the continuity of one of the side surfaces of the housing 3.

The first raised portion 65 makes it possible to hang the device 1 on the edge of a vessel, avoiding the user having the carry the device 1 at arm's length during its operation. This system also makes it possible to have a sculling effect, i.e. the shaft can be pivoted around the raised portion, minimizing the amount of force to be supplied by the user for operating the device 1. This function, carried out by the first raised portion 65, is especially useful for devices that are heavy and/or have a very long shaft. A very long shaft corresponds, for example, to a shaft where the length is greater than or equal to 350 mm.

According to the embodiment of the invention presented in FIG. 4, the male plug 15 comprises a second raised portion 67 oriented substantially opposite the first raised portion 65 when the male plug 15 and female socket 5 are assembled. The raised portion 67 can be overmolded on the male plug 15. The first raised portion 65 and the second raised portion 67 each form a stop, said stops together being able to hold the electric power cable 13 in position wound around the housing. This device forms a storage system for the electric power cable 13.

The electric power cable 13 has the special feature of being overmolded with a curved shell near its extremity connected to the male plug 15, so as to orient the electric power cable 13 to make it easier to wind it around the housing. This configuration prevents too great a bending of the electric power cable 13 at the location of its extremity connected to the male plug 15.

According to another embodiment of the invention, the second raised portion 67 is arranged on the housing 11 of the device 1, close to the female socket 5, and oriented substantially opposite the first raised portion 65. Preferably, the housing 11 comprises a third raised portion arranged close to the second raised portion 67 and oriented substantially parallel to said second raised portion 67, such that the second raised portion 67 and the third raised portion form a groove, in which the electric cable 13 is positioned, when the cable 13 is wound around the housing 11.

The storage system for the electric power cable 13 described above makes it possible to overcome the frequently encountered problems of damage and even breakage of the electric power cable 13, in particular when the position wound round the housing results in significant folding, for example approaching 90°, of the electric power cable 13 close to its extremity connected to the male plug 15.

The invention claimed is:

1. A device comprising:
an electric motor connected to a housing comprising a female electrical socket;
an electric power cable having a male plug configured to engage with the female electrical socket, the male plug and the female electrical socket being assembled and separated along a first axis;
an electrical safety device comprising a first element borne by the male plug and a second element located within the housing;
wherein the second element has a locking element to lock an activation element which deactivates the electric motor of the device and to place the activation element in a deactivated position; and
wherein the first element of the male plug being configured to engage with the locking element to free the activation element in order to activate the electric motor and place the activation element in an activated position.

2. The device according to claim 1, wherein the second element is mobile within the housing and wherein the second element further comprises:
a spring that elastically recoils towards a locking position;
a first stop which, in the locking position, locks the activation element in the deactivated position; and
wherein the first element of the male plug being configured to move the second element out of the locking position.

3. The device according to claim 2, wherein the second element is mounted slidably in the housing along a second axis parallel to the first axis, the first element of the male plug being configured to make the second element slide out of the locking position, so as to free the activation element.

4. The device according to claim 2, wherein the activation element comprises a second stop to lock a power button of the device in an off position.

5. The device according to claim 1, wherein the locking element locks the male plug in the female electrical socket; and wherein the locking element comprises a third element located in the housing, configured to engage with the first element, the third element being mobile with respect to the housing so as to free the first element.

6. The device according to claim 5, wherein the locking element is configured to lock the male plug in the female electrical socket in a position to hold the activation element in the deactivated position.

7. The device according to claim 5, wherein the third element bears a third stop configured to engage with a fourth stop of the first element, the third element being mobile in translation with respect to the housing according to a third axis, so as to free the fourth stop.

8. The device according to claim 5, wherein the third element is a latch, mobile in translation with respect to the housing along a third axis substantially perpendicular to the first axis, between a rest position and a locking position, the latch comprising an orifice having a substantially triangular profile with a first narrow extremity and a second extremity that is wide along the third axis.

9. The device according to claim 8, wherein the first element is a pin borne by the male plug and positioned substantially parallel to the first axis, the pin comprising a conical or tapered portion positioned parallel to the first axis, the conical or tapered portion comprising a flared distal extremity forming a fourth stop and a narrow proximal extremity, the device being configured so that, when the latch is in the rest position, the narrow extremity of the orifice of the latch is located opposite the pin.

10. The device according to claim 9, wherein the pin comprises two aligned truncated cones, a first truncated cone being proximal, a second truncated cone being distal, a flared portion of the second truncated cone is the flared distal extremity forming the fourth stop, a flared portion of the first truncated cone forming a fifth stop.

* * * * *